Feb. 19, 1963   N. J. STODDARD ETAL   3,077,724
APPARATUS FOR PROCESSING YARNS
Filed Sept. 9, 1957                                10 Sheets—Sheet 1
FIG. I.
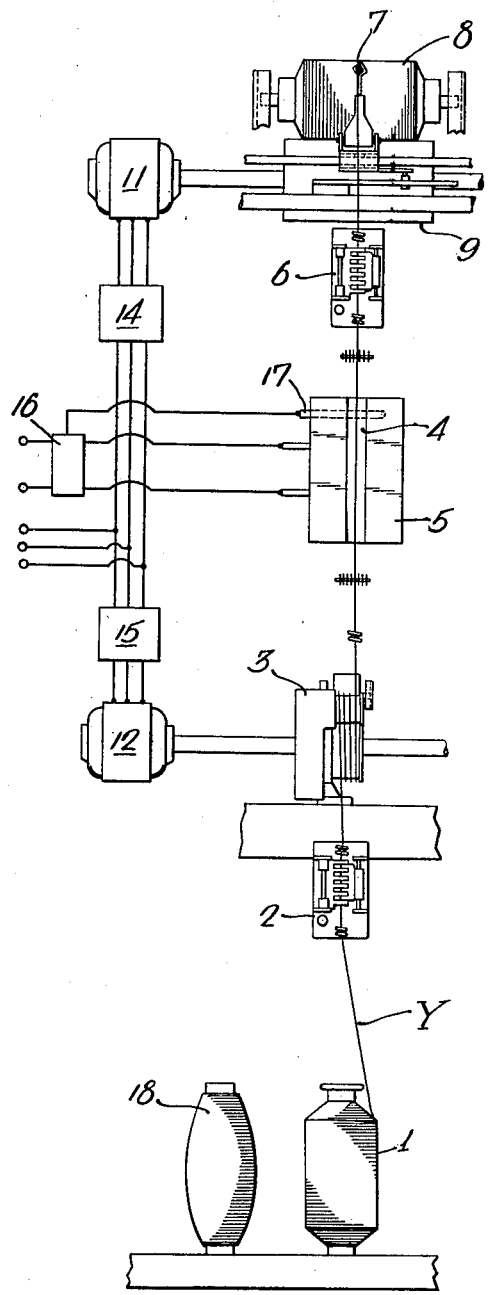
FIG. 2.
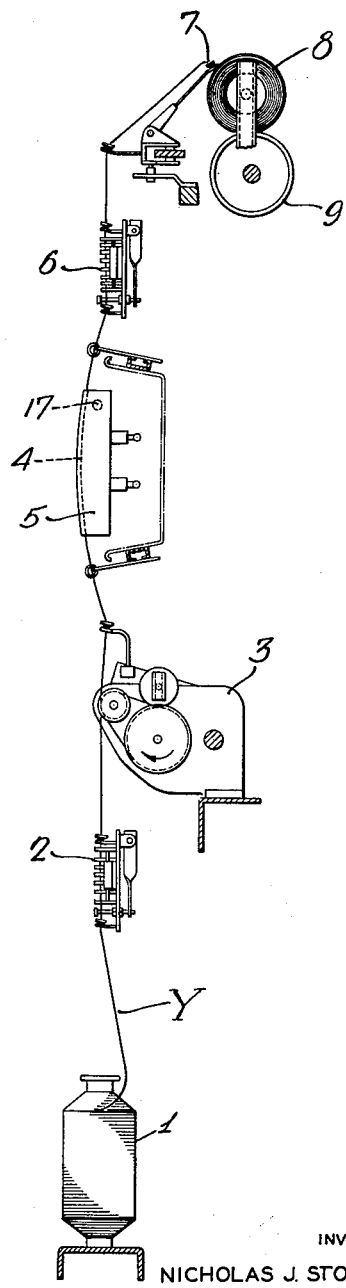
INVENTORS:
NICHOLAS J. STODDARD
WARREN A. SEEM
BY Howson & Howson
ATTYS.

Feb. 19, 1963  N. J. STODDARD ETAL  3,077,724
APPARATUS FOR PROCESSING YARNS
Filed Sept. 9, 1957  10 Sheets-Sheet 2
FIG. 3ᵃ
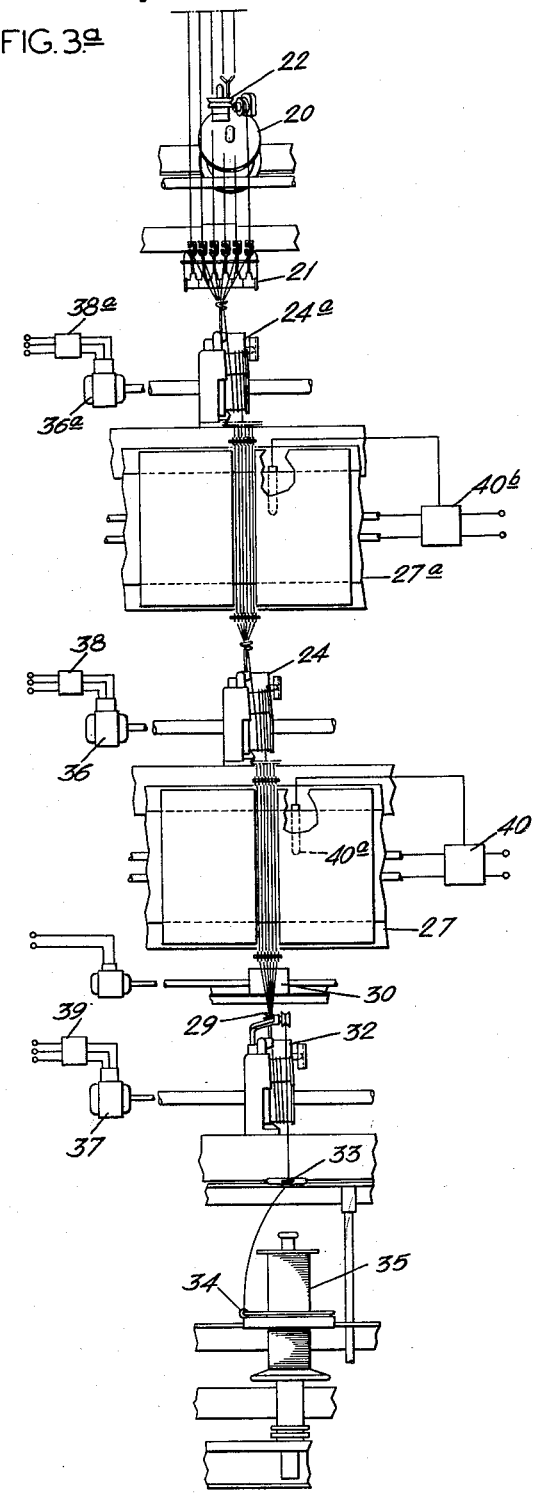
FIG. 1ᵃ
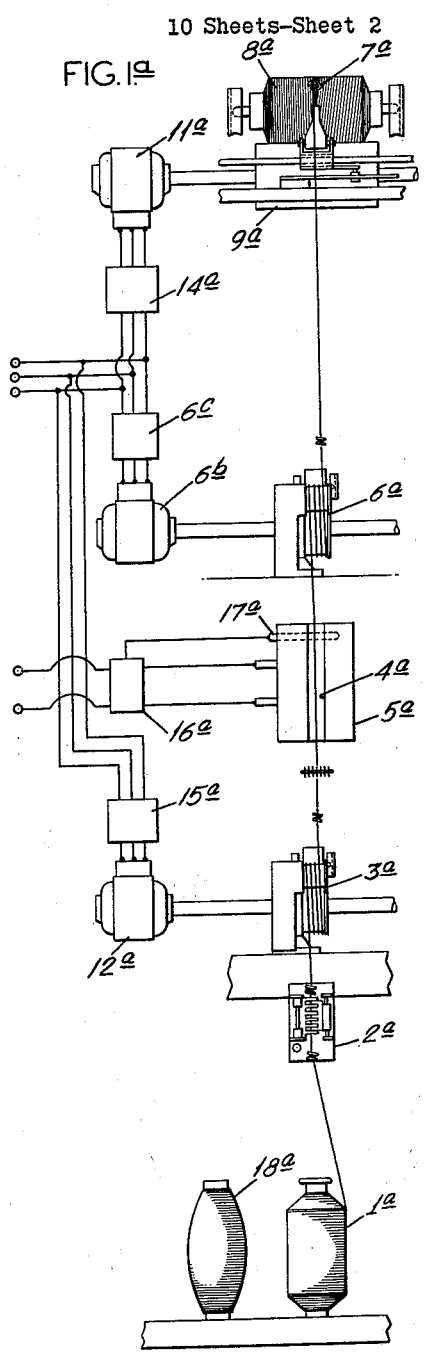
INVENTORS:
NICHOLAS J. STODDARD
WARREN A. SEEM
BY Howson & Howson
ATTYS.

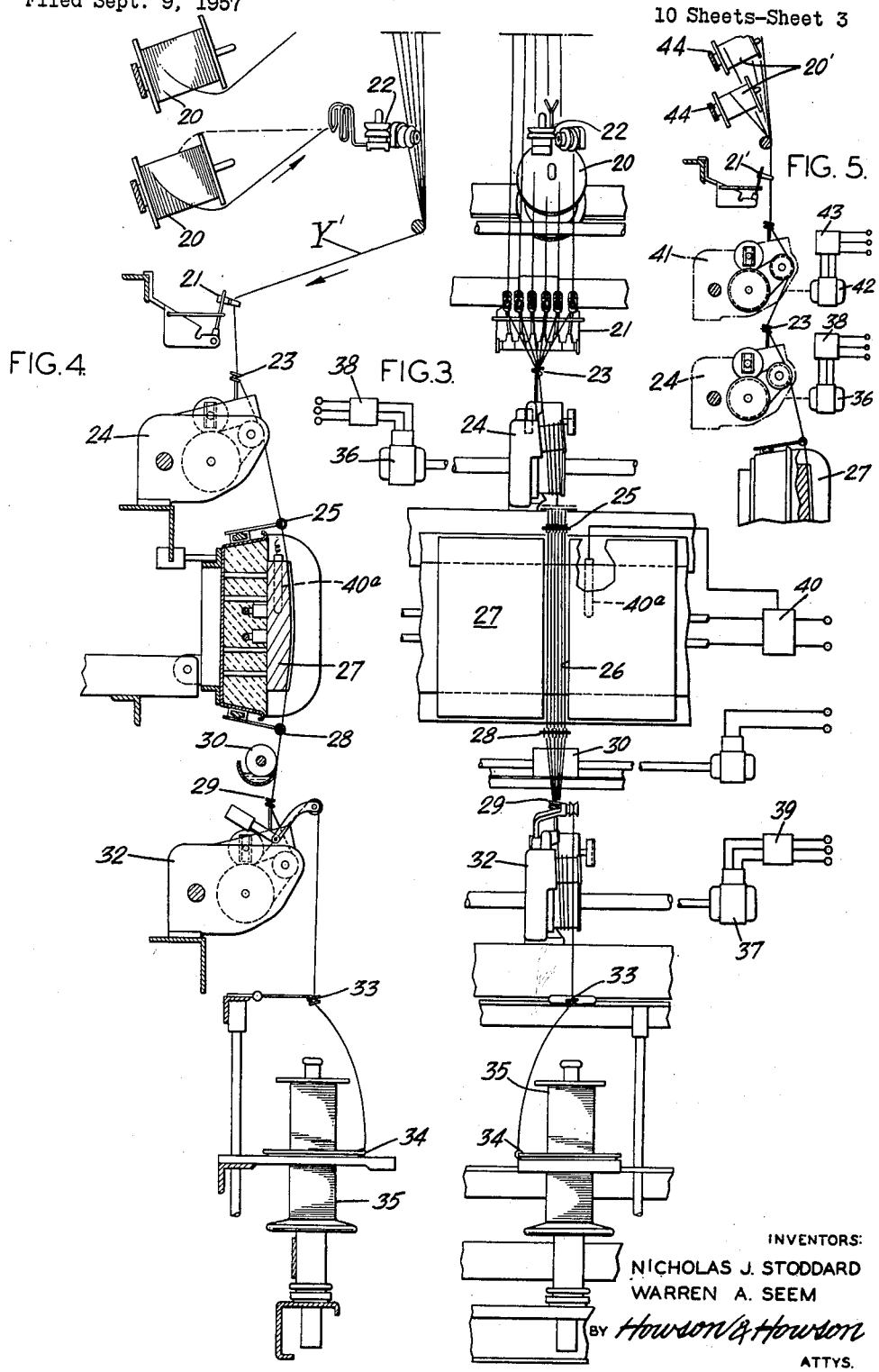

Feb. 19, 1963   N. J. STODDARD ETAL   3,077,724
APPARATUS FOR PROCESSING YARNS
Filed Sept. 9, 1957   10 Sheets-Sheet 4
FIG. 7
FIG. 6.
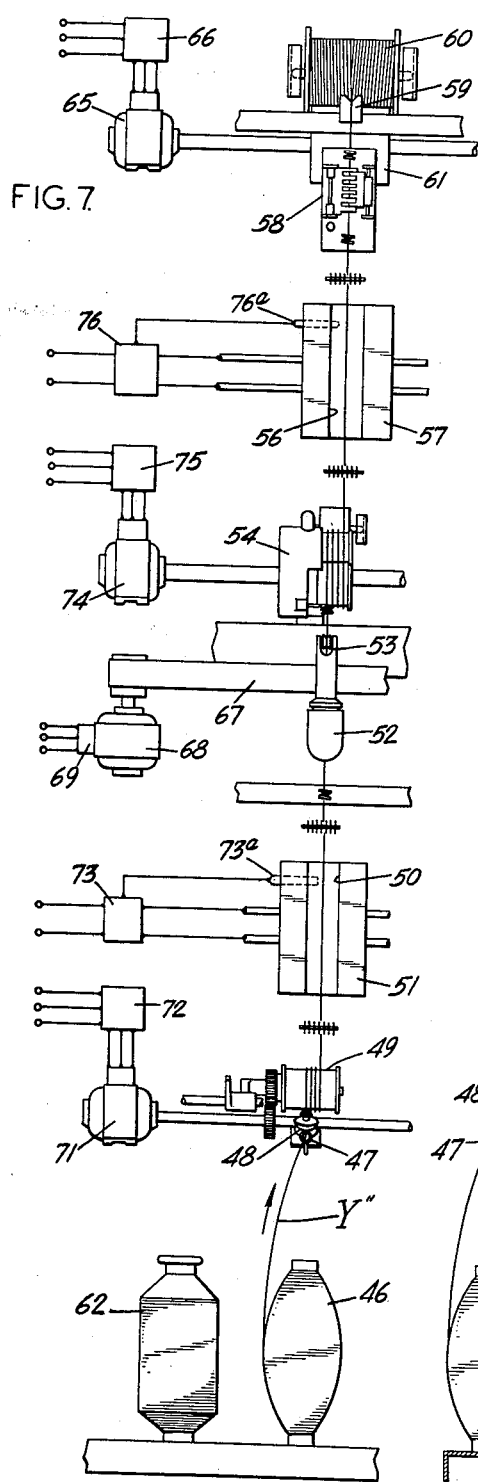
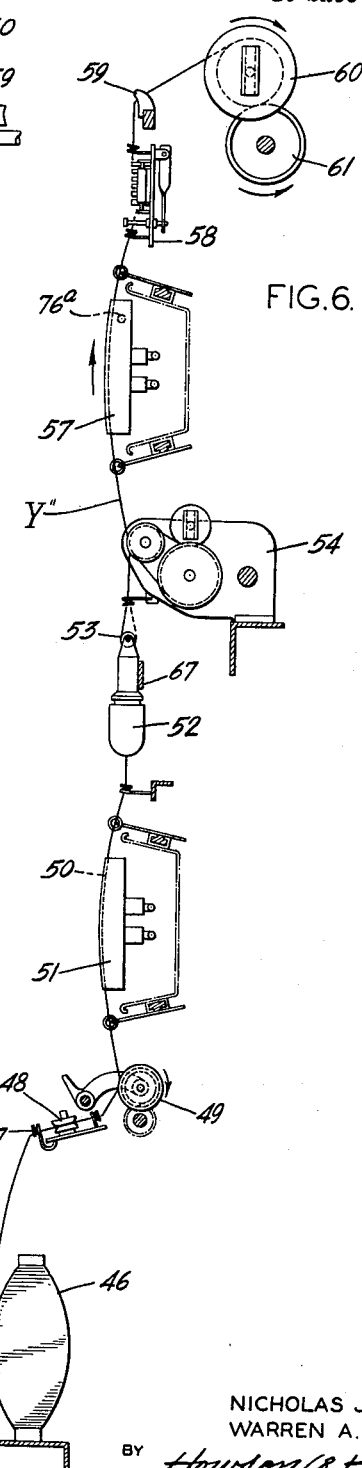
INVENTORS:
NICHOLAS J. STODDARD
WARREN A. SEEM
BY Howson & Howson
ATTYS.

Feb. 19, 1963   N. J. STODDARD ETAL   3,077,724
APPARATUS FOR PROCESSING YARNS
Filed Sept. 9, 1957   10 Sheets-Sheet 5

INVENTORS:
NICHOLAS J. STODDARD
WARREN A. SEEM
BY Howson & Howson
ATTYS.

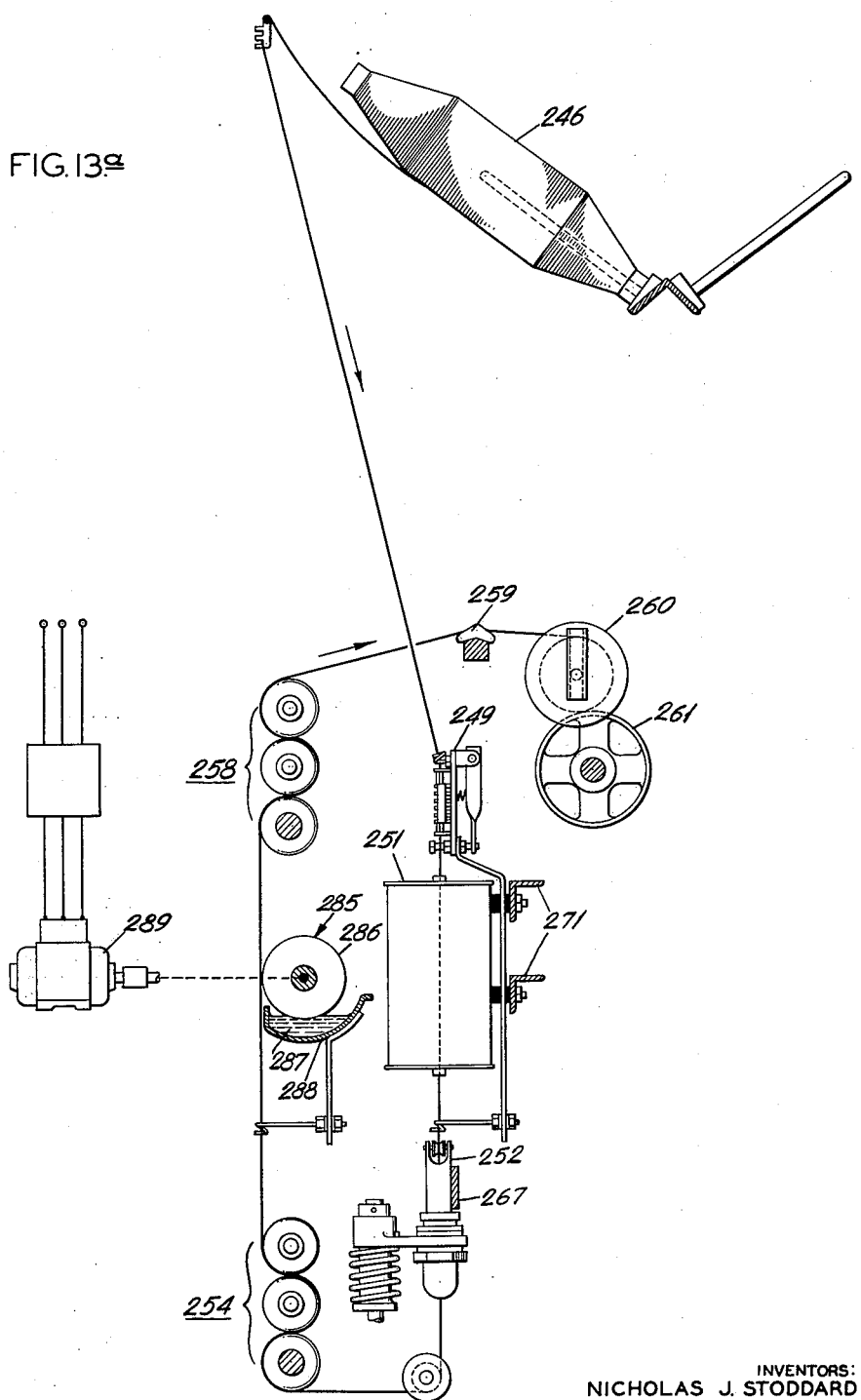

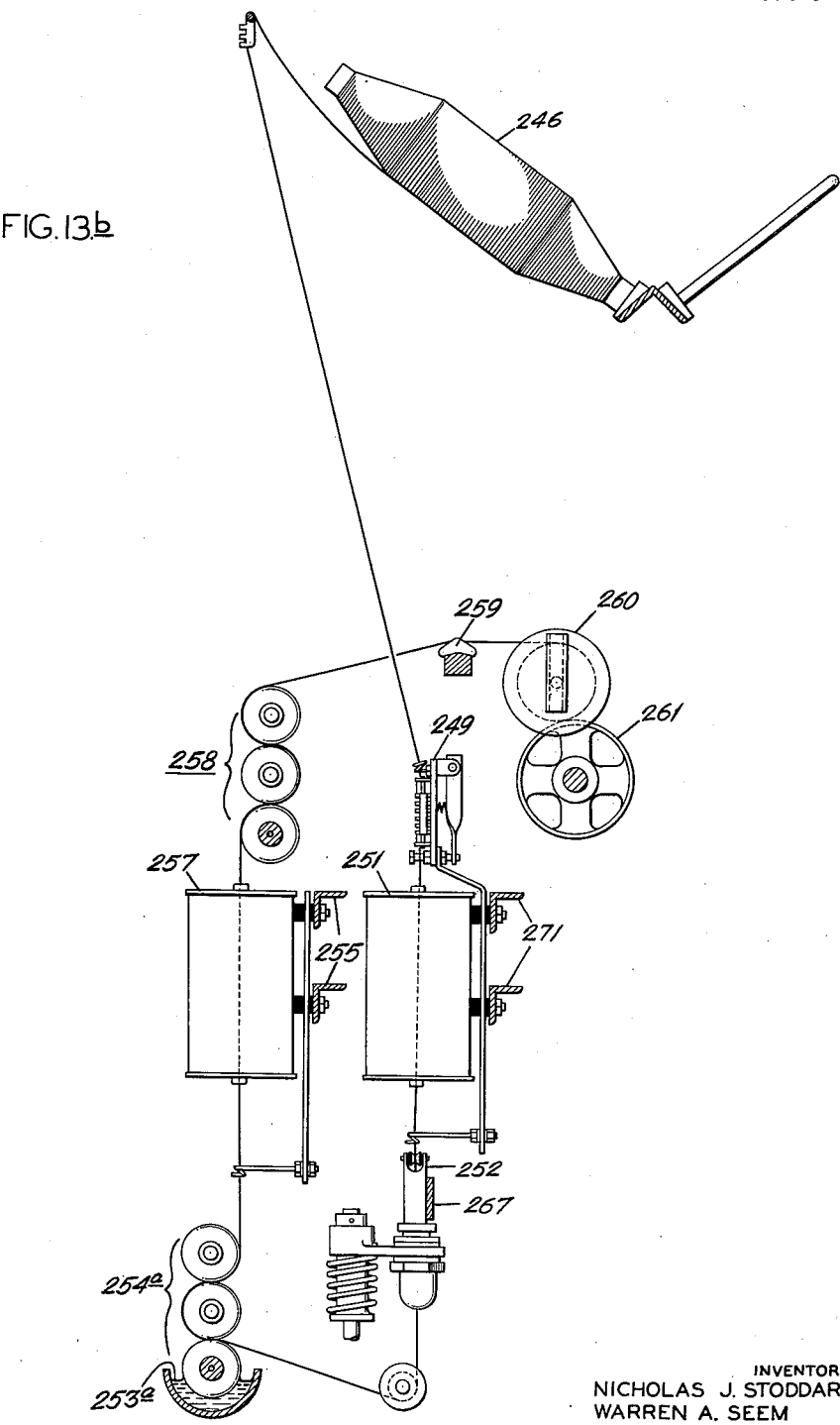
FIG. 13.b

Feb. 19, 1963   N. J. STODDARD ETAL   3,077,724
APPARATUS FOR PROCESSING YARNS
Filed Sept. 9, 1957   10 Sheets-Sheet 10
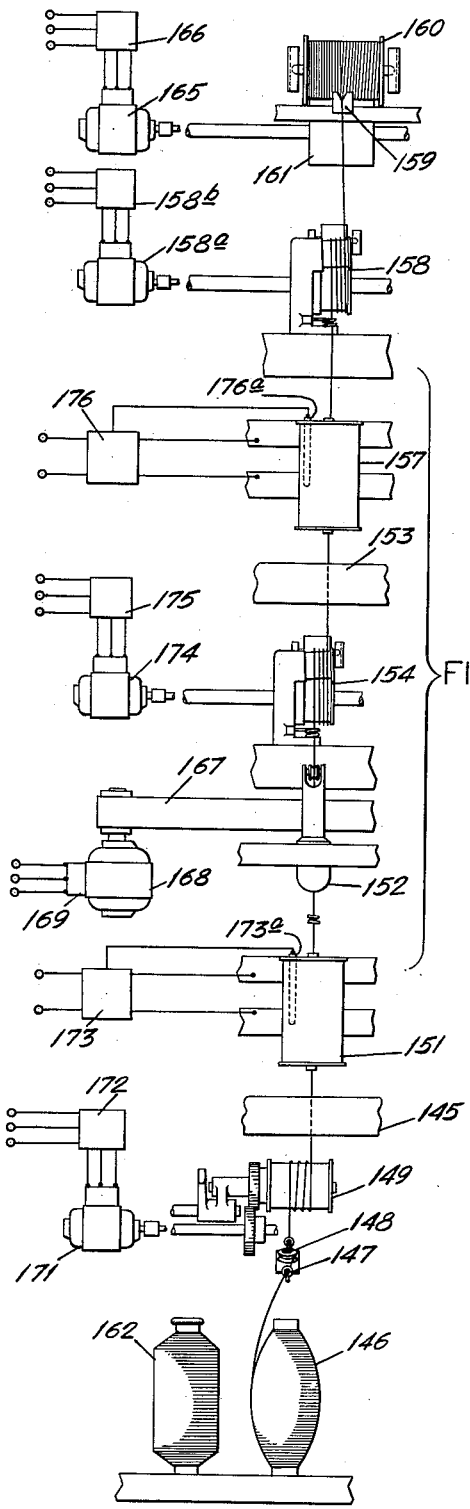
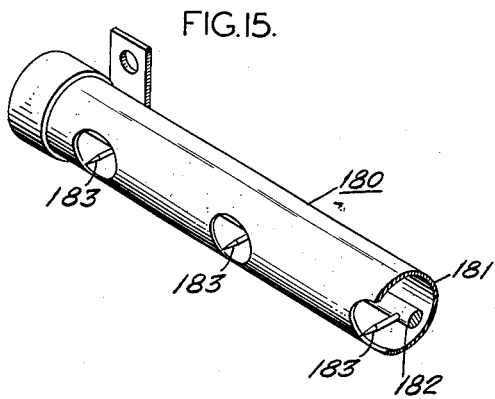
FIG.15.
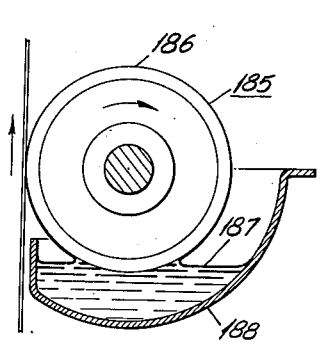
FIG.16.
INVENTORS:
NICHOLAS J. STODDARD
WARREN A. SEEM
BY Howson & Howson
ATTYS.

United States Patent Office 3,077,724
Patented Feb. 19, 1963

3,077,724
APPARATUS FOR PROCESSING YARNS
Nicholas J. Stoddard, Berwyn, and Warren A. Seem, Chester Springs, Pa., assignors to Leesona Corporation, a corporation of Massachusetts
Filed Sept. 9, 1957, Ser. No. 682,724
7 Claims. (Cl. 57—34)

The present invention relates to apparatus for reprocessing continuous and discontinuous multi-filament yarns and particularly those which are known as "textured yarns" and which have thermoplastic qualities. The invention has particular application to "torque stretch yarns" which have been produced by twisting a multifilament, setting the twist, and reverse twisting. The term "torque stretch yarn" is used in the specification and claims as a generic term regardless of the degree or amount of torque and stretch actually present in the finished yarn. The present application is a continuation in part of our application Serial No. 653,953, filed April 19, 1957.

A primary object of the present invention is to provide a method and apparatus for producing a yarn having regulated or controlled shape, luster, cross-sectional area, texture, dimensional stability, torque, resilience, residual shrinkage, stretch, recovery from stretch, and elasticity.

"Torque stretch yarns" are usually classified as stretch yarns because of their characteristic high degree of sensitivity to tensile stress, as for example, with nylon a load of only 0.03-0.04 gram per denier fully extends the yarn to the limit of its stretch characteristics which in many cases is several heundred percent. "Torque stretch yarns" have been advantageously used for the production of fabrics, such as stretch hosiery, but their sensitivity to tensile stress has been a deterrent to their use in many other fabrics. Such fabrics may include certain circular knit fabrics, flat knit fabrics, lace fabrics, and woven fabrics, to name the most common.

"Torque stretch yarns" manifest certain physical characteristics but also possess certain latent characteristics including the tendency or ability to change in shape, luster, cross-sectional area, torque, resilience, residual shrinkage, texture, elasticity, stretch, recovery from stretch and dimensional stability. These characteristics may become activated and manifest themselves during subsequent operations or storage of the yarn, or the gray or finished fabric formed therefrom.

After "textured yarns" in general and "torque stretch yarn" in particular are fabricated, it is common practice to use various finishing techniques to obtain desirable fabric characteristics. However, in fabric form, the geometry of the fabric and the limitations as to heat and tension that can be effectively applied to the yarns comprising the fabric, very greatly limit the extent to which the manifest physical characteristics of the yarns may be altered and the extent to which the latent characteristics of the yarns may be activated or deactivated. According to the present invention, no such limitations exist since it is possible to apply any desired heat ranging in temperature from ambient to the melting point of the yarns and any desired tension ranging from zero to the breaking point of the yarn in whatever correlation is required to produce the desired effect or effects.

Another deterrent to the use of "torque stretch yarns" is the fact that during storage of the yarn prior to fabrication of the fabric, the normally manifest characteristics of the yarn become latent. For example, if a "torque stretch yarn" is wound on a spool, it loses its manifest bulking characteristics to a degree dependent upon the length of time on the spool. If the yarn is immediately unwound, it manifests high bulking characteristics, but after a prolonged period, the bulking characteristics become latent and must be activated in order to be manifest. In addition, the position of each yarn section on the spool determines the amount of tension and lateral compression upon it, and since the position varies, some sections have different manifest characteristics than other sections. The non-uniform yarn when formed into fabrics may cause streaks or other undesirable irregularities in the fabrics. The present invention overcomes this problem by reprocessing the yarn to uniformly control or regulate its characteristics.

More specifically, the reprocessing of "torque stretch yarns" in accordance with the present invention is accomplished by subjecting the yarn to controlled degrees of tensile stress with or without correlated heat or both, and with or without additional twisting, untwisting, or false twisting. Preferably, the reprocessing is a continuous operation and may be carried out simultaneously with the initial production of the "torque stretch yarn" or in a separate operation following the initial production.

All of the objects of the present invention and the various details of the construction and operation of the apparatus and of the performance of the methods are more fully set forth hereinafter with reference to the accompanying drawings in which:

FIGS. 1 and 2 are respectively, front and side views of an apparatus according to the present invention;

FIG. 1a is a view similar to FIG. 1 at a slightly reduced scale showing a modification of the apparatus therein;

FIGS. 3 and 4 are similar views of another apparatus for performing methods according to the present invention;

FIG. 3a is a view similar to FIG. 3, but at a slightly reduced scale showing a modification of the apparatus therein;

FIG. 5 is a fragmentary view similar to FIG. 4 at a reduced scale illustrating another modification of the apparatus shown in FIGS. 3 and 4;

FIGS. 6 and 7 illustrate still another apparatus for performing methods according to the present invention;

FIG. 7a is a view similar to FIG. 7, but at a slightly reduced scale, showing modifications of the apparatus therein;

FIGS. 13a and 13b are views similar to FIG. 13 showing modifications of the apparatus therein;

FIG. 15 is a fragmentary perspective view of a static eliminator which may be employed in certain embodiments of the present invention; and FIG. 16 is a sectional view of a liquid-applicator device which may be used in place of the static eliminator shown in FIG. 15.

Figure 8:
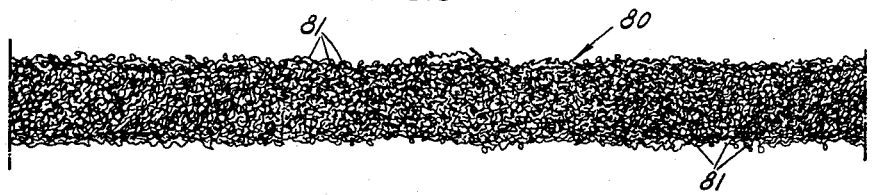
FIG. 8 is an enlarged view showing a multi-filament "torque stretch yarn" such as is reprocessed by the present invention.

As stated above, the primary object of the invention is to control, alter and regulate the manifest and latent physical characteristics of "torque stretch yarns" so as to produce yarns having the optimum of favorable manifest and latent physical characteristics in the yarn for subsequent yarn operations, for yarn storage, and for fabrication; in the gray fabric for fabric finishing; and in the finished fabric for the desired end uses.

The invention has various embodiments, and the embodiment which is preferred is dependent upon the yarn characteristics which are desired, and the individual peculiarities of the processor's plant.

By one embodiment (A) of the invention, the object is carried out by traveling the "torque stretch yarn" through a heated zone under tensile stress, the heat being correlated with the tensile stress upon the yarn. By another embodiment (B) of the invention, the object is carried out by continuously elongating the structural elements of a traveling "torque stretch yarn" at ambient temperature in one portion of its travel, and in another portion of its travel continuously controlling the tensile stress upon the traveling yarn while continuously traveling the yarn through a heated zone under the controlled tension, the heat being correlated with the tensile stress upon the yarn in the second portion of its travel. By another embodiment (C) of the invention, the object is carried out by continuously applying heat and correlated yarn tension to "torque stretch yarn" following its production without interrupting the linear movement of the yarn after the reverse twisting phase of its production. By another embodiment (D) of the invention, the object is carried out by continuously reducing tensile stress upon a "torque stretch yarn" following its production without interrupting the linear movement of the yarn after the reverse twisting phase of its production and continuously heating the relaxed traveling yarn. By another embodiment (E) of the invention, the object is carried out by continuously elongating the structural elements of a traveling "torque stretch yarn" at ambient temperature in one portion of its travel, and thereafter continuously reducing tensile stress in the traveling yarn in another portion of its travel and continuously heating the traveling yarn in the second portion of its travel in correlation with the reduced tensile stress. By still another embodiment (F) of the invention, the object is carried out by continually traveling a "torque stretch yarn" through a heated zone under correlated heat and tensile stress and continually traveling heated and tensioned yarn through a false twist spindle rotating in a direction to cause the yarn to be twisted and reverse twisted in directions opposite to the twist and reverse twist of its production.

The above-listed embodiments of the invention may be carried out continuously with the production of "torque stretch yarns," simultaneously or continuously with other normal subsequent yarn operations or as independent operations; with heat and tensile stress being employed to stabilize; increase or decrease the yarns' manifest physical characteristics and/or stabilize, activate, or further deactivate latent forces or characteristics of "torque stretch yarns."

The various embodiments of the invention may be carried out on yarn processing apparatus such as illustrated in FIGS. 1 to 7 and 13 and 14 of the drawings. In the forms of apparatus shown in FIGS. 1 to 5, the previously processed "torque stretch yarn" is continuously advanced from the supply package to the takeup package and is capable of being subjected to controlled tension without heat, controlled tension in various degree with correlated heat, or both in sequence. The apparatus includes a tension controlling device adjacent the supply package, a second tension controlling device in the form of feed rolls following the first tension controlling device, a heater to apply controlled heat to the yarn following the second tension controlling device, and means to positively advance the yarn adjacent the takeup package which cooperates with the second tension controlling device to control the tension on the yarn during its travel through the heating device. FIGS. 6 and 7 and 13 and 14 show forms of apparatus for originally producing the "torque stretch yarn" which has applied thereto an additional tension controlling device in the form of feed rolls and an additional heating device to apply controlled heat to the yarn prior to delivery of the yarn to the takeup package.

In FIG. 1, yarn Y is ravelled from a supply package 1 of previously processed "torque stretch yarn" and is passed between gates of an adjustable tension controlling device 2, around driven feed rolls 3, through a slot 4 of a heating device 5, through another tension controlling device 6; then through a traverse guide eye 7, and finally onto a takeup package 8, which is driven by a takeup roll 9. The rolls 9 and 3 are driven independently as indicated at 11 and 12 respectively, so that the speeds may be regulated, for example, by speed regulators 14 and 15. The temperature of the heating device 5 may be regulated to heat the yarn to any temperature above ambient that is desired, for example by regulating the voltage applied thereto as indicated at 16 in response to a thermostat 17 in the heater. The voltage is therefore regulated compensatively with the rate of heat transfer to the traveling yarn and ambient temperature to uniformly heat the yarn to the desired degree.

The tension in the yarn may be regulated to any degree by regulating the tension controlling device 2 and the feed rolls 3. The tension controlling device 6 is normally rendered inoperative, but when the feed rolls 3 overfeed the yarn to relax the same as it passes the heating device, the tension controlling device 6 is adjusted to apply sufficient tension in the yarn to enable the traverse guide eye to form a firm package.

The device may also be used to thermally process raw yarn, in which case a raw yarn package 18 is substituted for the package 1 of "torque stretch yarn."

It has been found desirable, in certain instances, to positively feed the reprocessed yarn to the traverse guide eye 7 and take-up package 8. This is especially true when advancing the yarn at low tension over the heater 5. To accomplish the positive feed of the yarn to the traverse guide eye 7, tension-controlling feed rolls are employed in lieu of the tension controlling device 6. This modification is shown in FIG. 1a wherein the yarn is raveled from a supply package 1a of previously processed "torque stretch yarn" and is passed between the gates of an adjustable tension controlling device 2a, around driven feed rolls 3a, through a slot 4a of a heating device 5a, through another tension controlling device 6a in the form of driven feed rolls similar to the feed rolls 3a, then through a traverse guide eye 7a, and finally onto a take-up package 8a, which is driven by a take-up roll 9a. The feed rolls 3a, 6a, and 9a are driven independently as indicated at 12a, 6b, and 11a respectively, so that the speeds may be regulated, for example, by speed regulators 15a, 6c and 14a. The temperature of the heating device 5a may be regulated to heat the yarn to any temperature above ambient that is desired, for example by regulating the voltage applied thereto as indicated at 16a in response to a thermostat 17a in the heater. The voltage is therefore regulated compensatively with the rate of heat transfer to the traveling yarn and ambient temperature to uniformly heat the yarn to the desired degree, as in the apparatus illustrated in FIG. 1. The apparatus of FIG. 1a may also be used to thermally process raw yarn, in which case a raw yarn package 18a is substituted for the package 1a of "torque stretch yarn." In either case, the tension of the yarn in the groove 4a of the heater 5a is controlled by regulating the relative speeds of the feed rolls 3a and 6a.

Embodiment (A) of the invention may be carried out by the use of the apparatus of FIGS. 1 and 2 or 1a. With the tension controlling device 2 or 2a operative or inoperative, the speed of the feed rolls 3 or 3a may be regulated relative to the speed of the takeup roll 9 or feed rolls 6a to feed the yarn Y, through the heating device 5 or 5a under any desired tensile stress up to the breaking point of the yarn. Likewise, the heating device 5 or 5a may be regulated to heat the traveling yarn to any desired temperature from ambient up to a temperature not substantially greater than the temperature used in setting the stretch characteristics of the "torque stretch yarn." The travel of the yarn in the apparatus of FIGS. 1 and 2 or 1a may be modified and still be used to carry out embodiment (A) of the invention by utilizing the tension controlling device 2 or 2a to apply any desired tensile stress up to the breaking point of the yarn. In this case, the yarn may bypass the feed rolls 3 or 3a.

Embodiment (B) of the invention may also be carried out by the use of the apparatus of FIGS. 1 and 2 or 1a. The tension controlling device 2 or 2a is adjusted to restrain freedom of travel of the yarn to an extent that the structural elements of the yarn are elongated, the tensile stress upon the traveling yarn is thereafter controlled by regulating the speed of the feed rolls 3 in relation to the speed of the takeup rolls 9 or feed rolls 6a, and the temperature of the heating device 5 or 5a is adjusted to heat the yarn to a temperature in any correlation with the tensile stress upon the yarn traveling therethrough.

Embodiment (E) of the invention likewise may be carried out by the use of the apparatus of FIGS. 1 and 2 or 1a. The tension controlling device 2 or 2a is adjusted to restrain freedom of travel of the yarn to an extent that the structural elements of the yarn are elongated. The speed of the feed rolls 3 or 3a in relation to the speed of the takeup rolls 9 or feed rolls 6a is adjusted so that tensile stress is reduced in the traveling yarn during its travel through the heating device.

In utilizing the apparatus of FIGS. 3 and 4, several strands of the yarn Y' are ravelled over the ends of supply packages 20 of previously processed "torque stretch yarn," are passed into engagement with tension controlling devices 22 through stop motion drop eyes 21, through a gathering eye 23, around driven feed rolls 24, through thread separator 25, through the slot 26 of a heating device 27, through a second thread separator 28 against a revolving oiling roll 30, through a gathering eye 29, around feed rolls 32, through a centering eye 33, then through a ring traveler 34 which imparts twist to the yarn, and finally the twisted yarn is wound onto a take-up spool 35. In the alternative, a filling-wind type of take-up shipping package may replace spool 35. This apparatus provides for the reprocessing of a plurality of strands of "torque stretch yarn" which are continuously plied and twisted together. The feed rollers 24 and 32 are driven independently as indicated at 36 and 37 and their speed is regulated by speed regulating devices indicated at 38 and 39. Likewise, the temperature in the heater 27 may be regulated compensatively with the rate of heat transfer to the traveling yarn and ambient temperature by regulating the electrical energy supplying the heater, for example by a regulator 40 controlled by a thermostat 40a.

It may be desired to heat the yarn to two different temperatures during its continuous travel from the supply package 20 to the take-up spool 35. To this end, an additional heater and tension-controlling feed rolls may be mounted between the feed rolls 24 and the stop motion drop eyes 21, for example as shown in FIG. 3a. As shown in this figure, tension-controlling feed rolls 24a similar to the feed rolls 24 are mounted below the drop eyes 21, and a heater 27a is mounted between the tension-controlling feed rolls 24a and 24. The feed rolls 24a are independently driven as indicated at 36a and are regulated as to speed by a speed regulating device 38a. The heater 27a is controlled as to temperature by regulating the electrical energy supplying the heater, for example by a thermostat-controlled regulator 40b. As shown in FIG. 3a, the yarns pass from a plurality of supply packages 20 through the drop eyes 21, around the tension-controlling feed rolls 24a through the heater 27a, around the tension-controlling feed rolls 24, through the heater 27, over the liquid-applicator roll 30 around the feed rolls 32, through the centering eye 33, then through a ring traveler 34 and finally to the takeup spool 35. Pretension may be applied by the tension device 22, or if desired, by still another set of feed rolls which may replace the tension device 22, as set forth below in connection with FIG. 5. Tension on the yarns through the heater 27a is regulated by controlling the relative speeds of the feed rolls 24 and 24a. Tension through the heater 27 is applied by controlling the relative speeds of the feed rolls 24 and 32 and the temperatures to which the yarns are heated in the heaters 27a and 27 are controlled by the regulators 40 and 40b.

If in the apparatus of FIGS. 3 and 4 or 3a it is desired to obtain greater tension than that available with tension controlling devices such as shown at 22, the apparatus may be modified as shown in FIG. 5 to replace the tension controlling devices 22 with positively driven feed rolls 41. The feed rolls 41 are driven independently, for example as indicated at 42 and the speed of rotation may be regulated by a speed regulator 43.

When using either the feed rolls 24a or 41, it is practical to ravel the yarn from the side of the packages. This arrangement is shown in FIG. 5 wherein the supply packages 20' are rotatable on the creel 44. Otherwise, the apparatus of FIG. 5 is identical to that of FIGS. 3 and 4, and the yarns are ravelled from the packages 20', through the stop motion drop eyes 21', over the feed rolls 41 and 24, and through the rest of the apparatus as described above in connection with FIGS. 3 and 4 or 3a.

Embodiment (A) of the invention may be carried out by the use of the apparatus of FIGS. 3–5. Any desired tensile stress up to the breaking point of the yarn may be applied to the yarn passing through the heating device 27 by the tension controlling device 22 or by regulating the speed of the feed rolls 24 or 41 in relation to the speed of the feed rolls 32, with the temperature of the heating device 27 adjusted to heat the yarn to any temperature from ambient up to a temperature not substantially greater than the temperature employed to set the stretch characteristics in the "torque stretch yarn."

Embodiment (B) of the invention may also be carried out by the use of the apparatus of FIGS. 3–5. The tension controlling device 22 or the rolls 41 are controlled in speed to restrain freedom of travel of the yarn to an extent that the structural elements of the yarn are elongated; the tensile stress upon the traveling yarn through the heating device 27 is controlled by regulating the speed of the feed rolls 24 in relation to the speed of the feed rolls 32; and the temperature of the heating device 27 is adjusted to heat the yarn to a temperature in any desired correlation with the tensile stress upon the yarn traveling therethrough.

Embodiment (E) of the invention may also be carried out by the use of the apparatus of FIGS. 3–5. The tension controlling device 22 is adjusted or the rolls 41 are controlled in speed to restrain freedom of travel of the yarn to an extent that the structural elements of the yarn are elongated and the speed of the feed rolls 24 in relation to the feed rolls 32 is adjusted so that tensile stress is reduced in the traveling yarn during passage through the heating device 27.

Embodiments (A), (B), and (E) of the invention may also be carried out by the use of the apparatus of FIG. 3a in the manner described above by by-passing the feed rolls 24a and heater 27a, or by deenergizing the heater 27a and using the rolls 24a in place of the device 22 (FIG. 3) or the rolls 41 (FIG. 5). The apparatus of FIG. 3a also enables the practicing of other embodiments of the invention not enumerated above. For example, with this apparatus, embodiments (B) and (E) may be modified by elongating the structural elements of a traveling "torque stretch yarn" at an elevated temperature in the first portion of its travel. In the alternative, the structural elements could be shortened at an elevated temperature during the first portion of its travel, or even further, the elements may be stabilized at an elevated temperature during the first portion of the travel. Other embodiments of the invention will be apparent to the worker in the art.

FIGS. 6 and 7 of the drawings diagrammatically illustrate one conventional false twist apparatus for the production of "torque stretch yarns" with added components to make possible the processing of "torque stretch yarn" by the invention continuously with its production. In utilizing the apparatus of FIGS. 6 and 7, "torque stretch yarn" is produced by a false twist method, comprising the steps of ravelling raw yarn Y″ from a producer's package 46 and passing it through a centering eye 47, in engagement with a disc tension 48, around feed roll 49, through a slot 50 in a heating device 51, up through a revolving false-twist spindle 52 and around the exit roll 53 on the false twist spindle 52 from which the yarn emerges as a "torque stretch yarn." In the prior apparatus, the yarn would travel from the exit roll 53 directly to a traverse guide eye 59 and then onto a takeup package 60, but by the present invention, the "torque stretch yarn," after leaving the exit roll 53, is passed around feed rolls 54, through a slot 56 of a second heating device 57, through a winding-tension controlling device 58, then over a traverse guide eye 59 and finally onto takeup package 60. In accordance with certain embodiments of the present invention, it may be desired to process "torque stretch yarn" on this apparatus. In this case, a package 62 of "torque stretch yarn" is substituted for the package 46 of raw yarn.

The speed of the yarn through the heater 57 is controlled by the speed of the takeup package 60 which is driven by the takeup roll 61 by means of a driving device 65 having suitable regulating means, for example, as indicated at 66. The amount of false twist inserted in the yarn is regulated by regulating the speed of the traveling belt 67 driving the false twist spindle 52, which in turn is controlled as to speed by a motor 68 having a speed regulator 69 incorporated therewith. The tension on the yarn as it is false twisted is controlled by controlling the speed of the feed rolls 49 in relation to the speed of feed rolls 54 as for example by motors 71 and 74 having speed regulators 72 and 75 respectively, and by controlling the tension in the disc tension 48. The amount of heat imparted to the twisted traveling yarn is controlled by regulating the energization of the heater 51, for example by a regulator 73 which is responsive to a thermostat 73a. In the present instance, the speed of the yarn through the false twist spindle is regulated by regulating the speed of the feed rolls 54. The feed rolls 54 are driven independently, for example by a motor as indicated at 74 having a speed regulating device 75 incorporated therewith. The tension on the yarn traveling through the heater between the feed rolls 54 and the tension controlling device 58 is controlled by regulating the relative speeds of the driving devices 65 and 74. The tension controlling device 58 controls the wind-up tension in the usual manner. Likewise, the heat applied to the yarn by the heater 57 is controlled compensatively by controlling the energization of the heater 57, for example by a regulator 76 responsive to a thermostat 76a.

The apparatus of FIGS. 6 and 7 may be modified without departure from the present invention. For example, as shown in FIG. 7a, tension-controlling feed rolls 158 may be employed in lieu of the tension-controlling device 58, can-type radiant heaters 151 and 157 may be employed in lieu of the plate-type contact heaters shown at 51 and 57. In addition, a static eliminator or a liquid-applicator device, or both, may be provided in advance of each heater, or one or the other, as desired. In the operation of the apparatus of FIG. 7a, the yarn from a producer's package 146 is raveled and passed through a centering eye 147, in engagement with a disk tension 148, around a feed roll 149, and through a device 145 which may be a static eliminator such as shown in FIG. 15 or a liquid applicator device such as shown in FIG. 16, or both if desired. The yarn from the device 145 is then passed through a can-type heater 151 which is similar to the heater disclosed in U.S. Patent No. 2,803,105 of August 20, 1957. From the heater 151 the yarn passes through a false twist spindle 152, around feed rolls 154, and through a device 153 which may include a static eliminator such as shown in FIG. 15 or a liquid-applicator device, such as shown in FIG. 16. From the device 153, the yarn passes through a can-type heater 157 similar to the heater 151, around winding-tension controlling feed rolls 158, then over a traverse guide eye 159 and finally onto a take-up package 160. In the event it is desired to process "torque stretch yarn" on this apparatus, a package 162 of "torque stretch yarn" is substituted for the package 146 of raw yarn.

The yarn is positively advanced to the take-up package 160 at the proper tension by correlating the speed of the take-up package with the speed of the feed roll 158. To this end, the take-up package is controlled as to speed by controlling the speed of its take-up roll 161 by means of a driving device 165 having suitable regulating means, for example as indicated at 166. The speed of the rolls 158 is controlled by a driving device 158a having suitable regulating means, for example as indicated at 158b. The feed rolls 158 also control the speed of the yarn through the heater 157, and the tension of the yarn is controlled by controlling the speed of the feed rolls 154 relative to the rolls 158, for example by the drive means 174 controlled as to speed by a regulator 175. The amount of heat imparted to the yarn by the heater 157 is controlled compensatively by controlling the energization of the heater 157, for example, by a regulator 176 responsive to a thermostat 176a.

The device 153 may take the form of a static eliminator such as shown in FIG. 15. In this figure, the static eliminator is shown at 180 and comprises a tubular member 181 which is grounded to the frame of the machine and a central static bar 182 having a plurality of points 183 connected to a high voltage source. The static eliminator is a commercially-available model and is not described in detail.

In lieu of the static eliminator 180, the device 153 may comprise a liquid applicator device such as shown at 185 in FIG. 16. The liquid applicator device comprises a driven roll 186 in contact with liquid 187 in a trough 188. The upwardly traveling yarn through the device 153 contacts the roll 186 and receives the liquid carried by the roll from the supply 187. The liquid supply may be a sizing, a dye, or plain water, depending on the requirements of the producer. The liquid is effective to eliminate static on the yarn as effectively as the static eliminator 180. It is desirable to eliminate any static from the yarn to prevent the yarn from contacting the central tube of the heater 157, so that the heat applied to the yarn is truly radiant.

The tension on the yarn as it is false twisted is controlled by controlling the speed of the feed rolls 149 relative to the speed of the feed rolls 154 as for example by a drive means 171 having a speed regulator 172. The amount of twist inserted and removed in the yarn by the false twist spindle is regulated by regulating the speed of the traveling belt 167 driving the false twist spindle 152, which in turn is controlled as to speed by a motor 168 having a speed regulator 169 incorporated therewith. The amount of heat imparted to the twisted traveling yarn is controlled by regulating the energization of the heater 151, for example by a regulator 173 which is responsive to thermostat 173a. The heat is therefore controlled compensatively with the rate of yarn travel through the heater and ambient temperature.

It is to be understood that the feed rolls 158 may be used with a contact heater such as shown at 57 and 51 in FIG. 7, and the radiant heaters 157 and 151 may be used with a tension-controlling device such as shown at 58 in FIG. 7.

Figure 13:
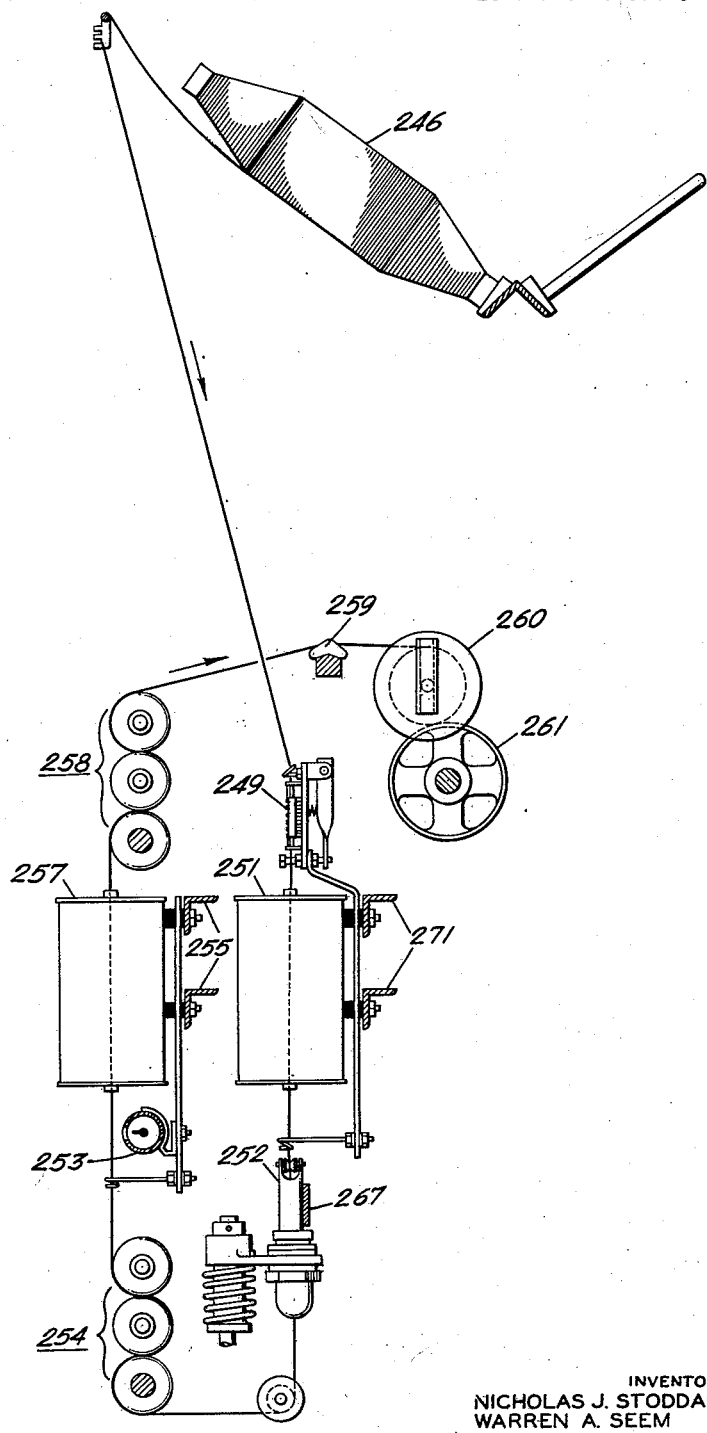
FIGS. 13 and 14 illustrate still another apparatus for performing methods according to the present invention.
Figure 14:
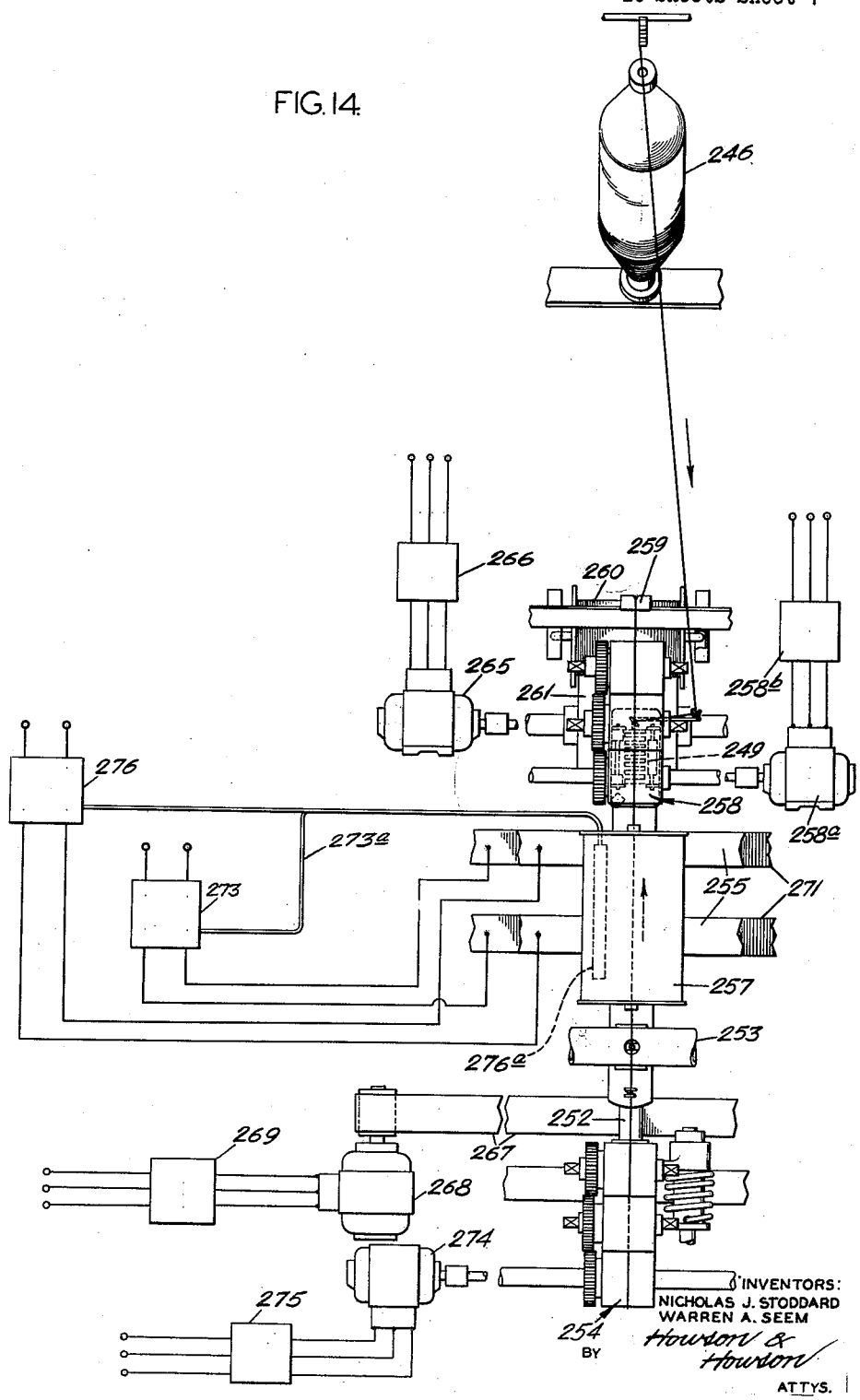

FIGS. 13 and 14 of the drawings diagrammatically illustrate another conventional false twist apparatus for the production of "torque stretch yarn" with added components to make possible the processing of "torque stretch yarn" by the invention continuously with its production. This conventional false twist apparatus is disclosed in detail in the aforementioned Patent No. 2,803,105. In utilizing the apparatus of FIGS. 13 and 14, "torque stretch yarn" is produced by a false twist method, comprising the steps of raveling raw yarn from a producer's package 246, passing it through a tension-controlling device 249, through a can-type heater 251, and down through a revolving false twist spindle 252 from which the yarn emerges as a "torque stretch yarn." In the prior apparatus, the yarn would be passed directly to a traverse guide eye 259 and then onto a takeup package 260 driven by a roll 261, but by the present invention, the "torque stretch yarn," after leaving the false twist spindle 252 is passed around feed rolls 254, past a static eliminator 253 similar to the eliminator 180 described above, through a second heating device 257, around winding-tension controlling feed rolls 258, then over the traverse guide eye 259 and onto the take-up package 260. If it is desired to process "torque stretch yarn" on this apparatus, a package of "torque stretch yarn" is substituted for the package 246 of raw yarn.

The take-up speed of the yarn is controlled by the speed of the take-up roll 261, for example by the driving device 265 having suitable regulating means as indicated at 266. The amount of tension on yarn during take-up is controlled by regulating the speed of the feed roll 258, for example by regulating the speed of the driving device by a variable speed driving device 258a having a regulator 258b. The speed of the feed rolls 258 controls the speed of the yarn through the heater 257, and the amount of tension on the yarn passing through the heater 257 is regulated by controlling the speed of the feed rolls 254 relative to the speed of the feed rolls 258, for example by regulating the speed of the drive 274 by means of a regulator 275. The temperature to which the yarn is heated in the heater 257 is controlled by regulating the supply of energy to the heater compensatively with the rate of travel of the yarn through the heater and ambient temperature. The heater 257 is supplied by means of bus bars 255, 255 connected to a source of voltage through a regulator 276 controlled by a thermostat 276a in the heater 257.

The speed of the feed rolls 254 also controls the speed of travel of the yarn through the heater 251 and the false twist spindle 252. The tension on the yarn as it is false twisted is controlled by the tension-controlling device 249. The amount of false twist imparted by the spindle 252 is regulated by regulating the speed of the traveling belt 267 driving false twist spindle 252, which in turn is controlled as to speed by a motor 268 having a speed regulator 269. The amount of heat imparted to the yarn twisted by the false twist spindle is controlled by regulating the energization of the heater 251. The heater is energized by the bus bars 271, 271 which are connected to a source through a regulating device 273 which is controlled compensatively by connections 273a to a thermostat (not shown) in the heater 251.

In certain installations, it may be desired to employ hot water, hot dyestuffs or the like to heat the yarn between the feed rolls 254 and 258. This may be accomplished, as shown in FIG. 13a by removing the heater 257 and mounting a liquid applicator 285 in its place. The applicator 285 comprises a driven roll 286 which contacts the upwardly traveling yarn and applies hot liquid thereto from the supply 287 contained in the underlying trough 288. Preferably, the liquid is continuously circulated through the trough 288 and is maintained at the proper temperature and concentration by conventional regulating means (not shown). The roll 286 may be driven in any suitable manner, for example by a motor 289. The remaining parts of the apparatus are identical to the parts shown in FIGS. 13 and 14 and corresponding reference numerals have been applied. It is noted that the static eliminator 253 is omitted since the liquid applicator 285 operates to eliminate static from the upwardly traveling strand.

The static eliminator 253 of FIGS. 13 and 14 may also be rendered unnecessary by utilizing the feed rolls 254 as a liquid applicator, for example as illustrated in FIG. 13b. In this figure, the parts are identical to the parts shown in FIG. 13 with the exception of the feed rolls 254. In FIG. 13b, the feed rolls are modified as indicated at 254a to include a liquid supply 253a cooperating with the lowermost roll of the feed rolls 254a to apply liquid to the yarn coming from the false twist spindle 252. The liquid may be water, dyestuff, sizing, or the like as required by the particular installation. Except for the elimination of the static eliminator 253 and the modification of the feed rolls 254, the apparatus is identical to that shown in FIGS. 13 and 14 and identical reference numerals have been applied to corresponding parts.

Embodiment (C) of the invention may be carried out by the use of the apparatus of FIGS. 6 and 7, 7a, 13 and 14, 13a or 13b. The processed "torque stretch yarn" traveling upwards from the spindle 52, 152, or 252 is under normal tensile stress required for the production of the particular yarn but by adjusting the speed of the take-up roll 61, the feed rolls 158 or the feed rolls 258 in relation to the speed of the feed rolls 54, 154, 254, or 254a, any desired tension is applied to the yarn and the temperature of the heating device 57, 157, 257, or 285 is adjusted to obtain any correlation of heat and tension desired in the traveling yarn.

Embodiment (D) of the invention may also be carried out on the apparatus of FIGS. 6 and 7, 7a, 13 and 14, 13a, or 13b. The processed "torque stretch yarn" traveling from the spindle 52, 152, or 252 is under normal tensile stress required for the production of the particular yarn but by adjusting the speed of the take-up roll 61, feed rolls 158, or feed rolls 258 in relation to the speed of the feed rolls 54, 154, 254, or 254a, tensile stress is reduced in the yarn and the relaxed yarn is heated as it travels through the heater 57, 157, 257 or 285.

Embodiment (F) of the invention may also be carried out on the apparatus of FIGS. 6 and 7, 7a, 13 and 14, 13a or 13b. When the apparatus is so used, the yarn from a package of "torque stretch yarn" is substituted for the package 46, 146, or 246 of raw yarn; and the feed rolls 54, 154, 254, or 254a, the heating device 57, 157, 257, or 285 and the winding tension-controlling device 58, 158 or 258 are not used. The yarn is traveled through the heating device 51, 151 or 251 and the thermostat thereof is adjusted to cause the heater to heat the yarn to the desired temperature and tensile stress is applied to the yarn by adjusting the speed of the feed rolls 49, feed rolls 149, or tension-controlling device 249 in relation to the speed of the take-up roll 61, 161 or 261. The yarn is traveled through the false twist spindle 52, 152 or 252, the spindle rotating in a direction to cause the yarn to be twisted and reverse twisted opposite to the twist and reverse twist of its production. Then the yarn is traveled through the guide eye 59, 159 or 259 and onto take-up package 60, 160, or 260.

Embodiments (A), (B), and (E) of the invention may also be carried out by the use of the apparatus of FIGS. 6 and 7, 7a, 13 and 14, 13a or 13b in the same manner as previously pointed out with respect to the use of the apparatus of FIGS. 1 and 2 by by-passing the false twist spindle and maintaining the heater 51, 151 or 251 de-energized.

Multifilament "torque stretch yarns" are conventionally produced by three basic operations, the first being the twisting of the multifilament yarn which causes each individual filament to twist on its own axis and twist or spiral as a helix about the other filaments of the group. Unless the multifilament yarn is cold drawn while being so twisted, the second operation involves heat setting of the yarn, but in either cold drawing or heat setting, the molecules or structural elements of each individual filament of the yarn are reoriented to the twisted and spiralled shape according to the accepted theory of super-positioning. As a result of the reorientation, the new spiralled and twisted formation of the filaments become inherently permanent. The third step involves the twisting of the yarn in the opposite direction. Depending upon the degree of reverse twisting in relation to the initial twisting, the reverse twisting reduces or eliminates the extent to which each filament is wrapped about the others and physically holds the group in a compact unit.

Normally when such yarns are partially relaxed or relieved of tensile stress, each filament has a tendency to return to its super-positioned spiralled shape but is prevented from so doing by the torque forces resulting from the reverse twisting. These torque forces are in a direction opposite to that which would cause the spiralled formations to tighten and become of less amplitude or diameter, but rather these torque forces increase the amplitude or diameter of the spiralled formations. As a result, some of the spiralled formations accommodate or adjust themselves to the torque by springing into two partially spiralled formations of opposite direction with adjacent spirals assuming opposite directions.

Figure 12:
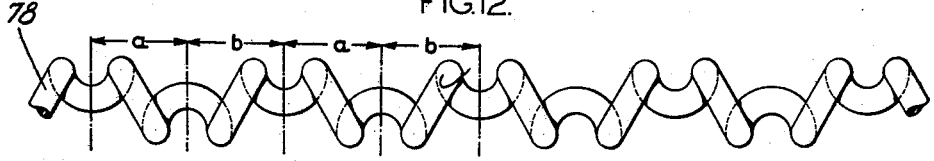
FIG. 12 is a greatly enlarged view of a filament embodying a uniform opposed partial spiralled formation which selected embodiments of the present invention tend to produce.

This opposed spiral formation is illustrated in FIG. 12 which represents a filament 78 of a multifilament stretch yarn which has been partially relaxed after production. Referring to FIG. 12, the filament 78 has been sub-divided into a plurality of sections indicated respectively at *a* and *b* by the broken lines shown therein. The section *a* of the filament 78 comprises a partial spiral in a Z direction. The section *b*, on the other hand, comprises a partial spiral in the S direction. The loop portions between the sections *a* and *b* are the result of the change from the S spiral to the Z spiral and vice versa.

To illustrate this principle, a person may take an expandable telephone cord which consists of a plurality of convolutions in helical form. This is analogous to a single filament of a multifilament stretch yarn after the initial twisting operation and subsequent setting operation. The reverse twisting operation may then be performed on the cord, and if sufficient tension is applied, the cord assumes a substantially straight condition. However, as the cord is relaxed, or if insufficient tension is applied, certain convolutions of the Z spiral spring into an S spiral, and the cord approaches the formation illustrated in FIG. 12.

Following the formation of opposed spirals, as the "torque stretch yarn" and its filaments are further relaxed, the torque forces cause groups of opposed spiralled formations to twist about themselves and pigtail to a degree where the resistance to further twisting is greater than the torque forces present, and as a result, neighboring spiralled and opposed spiralled formations twist about themselves and pigtail and so on at random throughout the length of the filaments of the yarn. This occurs randomly at the points offering the least resistance.

The variations in resistance to being deformed are primarily due to resistance offered by abutting filaments of the group which form the mutlifilament yarn, and variations in amplitude or diameter of the spiralled formations of the filaments resulting from the location of each individual filament relative to the center of the yarn. This relative location of a selected filament at any given point along the length of the yarn during the initial twisting in the production of the "torque stretch yarn," determines how many filaments of the multifilament yarn the selected filament spirals about. The number of filaments it spirals about, in turn, determines the amplitude or diameter of the spiral in the selected filament at the given point. For example, at one point in the yarn, a selected filament may lie in the exact center of the yarn. At this point, the selected filament would not spiral about any other filaments, but would only twist on its axis, the spiral thereby having zero amplitude or diameter. At a second point, the selected filament may lie on the outer periphery of the yarn. At this second point, the selected filament would spiral about every other filament in the yarn and its spiral at the second point would have maximum amplitude or diameter. Normally, a selected filament will be found in various relative locations along the length of the yarn.

The random pigtailing can be observed in the above illustration using a telephone cord by allowing the cord to relax further, in which event the opposed spiral formations form pigtails and create a generally tangled mass of wire.

Thus, with normally relaxed "torque stretch yarn," the group of substantially parallel filaments of the raw yarn is converted into a group of filaments having at random and of various magnitudes, spiralled formations in one direction, opposed partially spiralled formations, spiralled formations in the opposite direction, and groups of opposed spiralled formations twisted about themselves or pigtailed. These formations shorten the yarn and increase the area of the cross-section (bulk). Furthermore, these formations straighten under very little tensile stress and their effective length is increased as the yarn is stretched. This characteristic gives the yarn its so-called stretch characteristic.

The aforesaid irregular formations of the filaments comprising the "torque stretch yarn" is inherent to the yarn per se as well as in the yarn embodied in the fabrics made therefrom. By certain embodiments of the present invention, if desired, the irregular formations may be changed into a pattern of substantially uniform opposed partially spiralled formations of reduced and uniform magnitude and increased frequency as illustrated in FIGS. 10 to 12 of the drawings.

Figure 9:
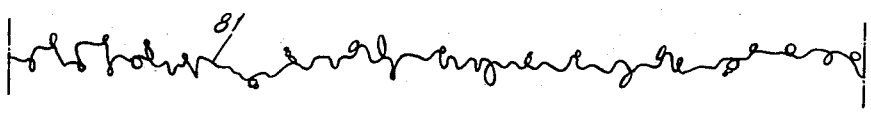
FIG. 9 is an enlarged view of a filament removed from the multi-filament yarn shown in FIG. 8.
Figure 10:
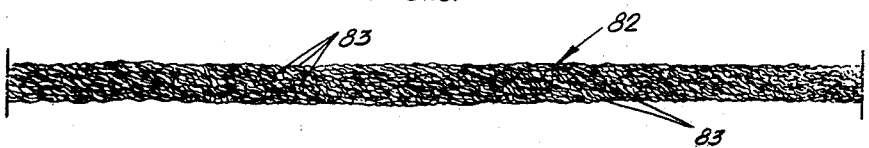
FIG. 10 is a view on the same scale as FIG. 8 showinng a yarn processed by another embodiment of the present invention.
Figure 11:
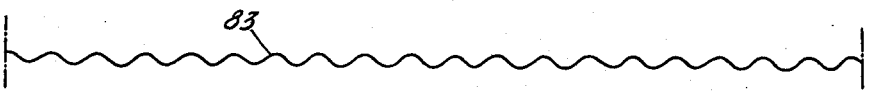
FIG. 11 is a view similar to FIG. 9 showing one filament of the yarn of FIG. 10.

Referring to FIGS. 8 to 12 of the drawings, FIG. 8 illustrates a "torque stretch yarn" 80 immediately following its production and when it has been allowed to relax, it will be observed that the filaments 81 composing the yarn exhibit pigtailed formations and the yarn has a generally irregular outline. FIG. 9 illustrates one of the filaments 81 shown in FIG. 8 at an enlarged scale. FIG. 10 illustrates a yarn 82 which may be produced by certain embodiments of the present invention. It will be observed that the individual filaments 83 making up the yarn 82 of FIG. 10 do not exhibit the pigtailed formations apparent in FIGS. 8 and 9, and the yarn 82 as a whole, has less bulk than the yarn 80. FIG. 11 illustrates an individual filament 83 removed from the yarn 82 of FIG. 10 and demonstrates that the pigtailed formations have been eliminated. Further examination under increased magnification of the filament shown in FIG. 11, reveals that the filament 83 approaches the regular opposed partially spiralled formations shown at 78 in FIG. 12.

Immediately after the processing of the raw yarn to form "torgue stretch yarn," the yarn so produced normally exhibits the tendency to relax into the condition shown at 80 in FIG. 8. Thus, the stretch characteristics of the yarn are manifest. However, after the yarn has been wound on a package under tension and is stored for a period of time, the stretch characteristics of the yarn become latent, and when the yarn is unwound from the package under minimum tension, the torque forces in the yarn are not sufficient to cause the yarn to shorten and assume the random pigtailed and irregular formations exhibited by a freshly produced yarn. The tendencies are present in the yarn, but instead of being manifest, they are latent. The latent tendencies may be made manifest by heat or tension.

The uniformity in the spiral formations is accomplished by subjecting the yarn to uniform correlated heat and tensile stress. The heat activates both the latent tendency of the filaments to assume spiralled formations and the opposed torsional forces and also makes the filaments more pliable so as to offer less resistance to the accomodation and equalization of the torque forces by partial spirals formed alternately in opposite directions. The yarn tension acts to prevent groups of spiralled or partially spiralled formations from twisting about themselves and forming pigtails to relieve the torque forces.

Of course, perfection is never attainable and consequently, it is not possible to attain by the invention a yarn whose every filament has precisely every other deformation of the same magnitude and partially spiralled in opposed directions as shown at *a* and *b* in FIG. 12. However, the various degrees of change towards perfection are such that a wide range of numerous distinctly different yarns result. For example, the present invention makes possible yarns ranging in shape; from irregular to very uniform, in luster: from high to low, in cross-sectional area: several hundred percent, in torque of the group of filaments: several hundred percent, in resilience: low to high, in residual shrinkage: several hundred percent, in texture: rough to smooth, in elasticity: fair to good, in stretch: several hundred percent, in recovery from stretch: good to very good, and in dimensional stability: low to very high. It is to be pointed out that although the bulk or cross-sectional area of the "torque stretch yarn" so processed may be greatly reduced in the yarn per se, the latent forces of the yarn cause the processed yarn in the fabric after finishing, to have greater bulk than possible with conventional "torque stretch yarn." It is noted that the characteristics listed above cannot be varied entirely independently of one ano her since changing certain of the above characteristics, effects changes in other characteristics. Thus, to obtain a suitable yarn for the desired purpose, the tension and heat are regulated to produce the dominant characteristic which are deemed necessary, and the unimportant characteristics are more or less disregarded.

"Torque stretch yarns" generally manifest a very high degree of stretch and recovery immediately after the reverse twisting phase of their production. This stretch and recovery may be up to over 400%. Unless wound into a skein and freely relaxed, such yarns, when stored upon their yarn packages, lose much of their manifest stretch and recovery characteristics. The degree of the loss for a given yarn depends primarily upon the tensile stress load upon the yarn in the package and the length of time of storage.

The maximum loss in the manifest stretch and recovery characteristic of a given yarn occurs when the yarn in the package is wound and stored under sufficient stress to just straighten substantially all of the variously spiralled and twisted deformations without elongating the structural elements of the filaments themselves.

When the same yarn is stored under a greater stress load which elongates the structural elements of the yarn, the elastic recovery of the yarn occurring as the load is removed upon raveling the yarn from the storage yarn package, mechanically activates the inherent torsional forces and manifests the tendency of the filaments to assume spiralled formations. The greater the extent of the recovery from stretch of the structural elements of the yarn, the greater is the aforementioned activating action.

In all yarn packages (except freely suspended and relaxed skeins, and it is not practical to fabricate from skeins), the stress upon the yarn comprising the packages varies considerably throughout the package. In commercial production, the length of time of package storage before fabrication also varies considerably. Consequently, the torsion and the degree of the tendency of the filaments to assume spiralled formations varies accordingly.

"Torque stretch yarn" processed under embodiments A, B, C, and F of the invention do not have these objectionable characteristics. Thus, by reprocessing the stretch yarn in accordance with the present invention, it is possible to impart to the yarn from each package, uniform characteristics of the type desired. Furthermore, yarns from packages which have been stored for varying lengths of time may be reprocessed to produce identical characteristics. Thus, when using reprocessed yarns from several packages, the characteristics of all the yarns are uniform and there is no possibility of streaks or other imperfection appearing in the fabric by reason of changes from one package to another. Thus, the present invention provides means for equalizing the characteristics of the yarn regardless of the length of time it has been stored and the tension with which it has been wound.

The effect of tension alone, heat alone, and heat and correlated yarn tension upon "torque stretch yarn" may be observed by the few simple Experiments A–E below:

EXPERIMENT A

Ravel by hand a multifilament "torque stretch yarn" from a normal package that has been standing for some time and observe that the shape of the yarn and its bulkiness varies considerably. Stretch the yarn lightly until resistance to stretching is just felt and then relax the yarn, observing that the yarn exhibited little stretch and recovery. This stretching extended the yarn to the limit of its stretch characteristics. Typically, the stretch might be 45%. Then stretch the yarn vigorously beyond the point where resistance is felt and permit it to relax, observing that the shape and bulkiness now becomes relatively uniform and the stretch and recovery is greatly increased and the yarn is somewhat similar to that shown at 80 in FIG. 8. This stretching extended the yarn beyond the limit of its stretch characteristics, but would not exceed the yield point of the structural elements. Typically, the stretch might be 140%. It is noted that the greater the tensile stress up to the yield point of the structural elements of the filaments, the greater is the activation of the dormant or latent forces.

EXPERIMENT B

Ravel yarn by hand from the same package of multifilament "torque stretch yarn" as used in Experiment A above. Gently heat a relaxed length of the yarn over an electric hot plate or other heating element and observe that the yarn shrinks or shortens to give it a high degree of stretch and recovery and the yarn is somewhat similar to that shown at 80 in FIG. 8. Typically, it might be 270%. It is to be noted that heat alone as used in this experiment, causes the "torque stretch yarn" to attain substantially more stretch and recovery than that attained by the use of yarn tension alone as used in Experiment A above. It is noted that the higher the heat up to about 10% less than the temperature used to produce the yarn, the greater is the activating of the latent forces.

EXPERIMENT C

Heat gently over an electric hot plate, the relaxed length of multifilament "torque stretch yarn" which has been vigorously stretched in Experiment A above. Observe that the yarn shrinks or shortens and attains a greatly increased stretch and recovery and is somewhat similar to that shown at 80 in FIG. 8. Typically, it might be 330%. It is noted that "torque stretch yarn" which has first been stretched and thereafter heated, attains a greater degree of stretch and recovery than "torque stretch yarn" that has been heated only.

EXPERIMENT D

Again using multifilament "torque stretch yarn" from the same package as used in Experiment A above, heat gently over an electric hot plate variously tensioned lengths of yarn. Observe that the yarn attains various greater degrees of dimensional stability depending upon the tension upon the yarn being heated. The stretch and recovery is likewise reduced variously down to as low as only a few percent. FIG. 10 shows a yarn 82 with good dimensional stability and low stretch. It is noted that heat and yarn tension must be correlated since manifest and latent forces may be activated at a given temperature and yarn tension, but deactivated if either the temperature or yarn tension is increased. An increase in temperature reduces the yield point of the yarn and permits the molecules or other structural elements of the filaments to be reoriented by the unchanged yarn tension. In addition, increased yarn tension by itself is sufficient at the unchanged temperature to cause the yarn to manifest the latent characteristics and effects superpositioning of the formations of the filaments.

EXPERIMENT E

Separate one of the filaments of the yarn of Experiment D and the yarns of Experiments A, B, and C and observe that the filaments of the yarns of Experiments A, B, and C have an irregular pattern of comparatively infrequent and high magnitude or amplitude spirals, partial spirals and twisted deformations, for example as shown at 81 in FIG. 9, whereas the filaments of the yarns of Experiment D have a uniform pattern of opposed partially spiralled formations of greatly increased frequency and greatly reduced magnitude or amplitude, for example as shown at 83 in FIG. 11.

With the above experiments in mind, it is apparent that various results may be obtained by the application of heat and tension to the yarn. As pointed out above, the effect of combined heat and tension is not the same as the effect of tension and heat applied in sequence.

Various possibilities afforded by the present invention are indicated by the various examples which follow. These examples are not exhaustive of the possibilities afforded by the invention, but are exemplary of the objects which are to be obtained by the invention.

*Example I*

The object is to produce a 70 denier 50 filament Dacron weaving yarn from a 70 denier 50 filament Dacron "torque stretch yarn." For best results, a weaving yarn to be used either in the warp or filling should have stability of its dimensions and shape so that normal tension variations of warping and weaving cause no material change in the length, cross-sectional area or shape of the yarn. If they are not eliminated, changes in dimensions of the yarn cause warp or filling streaks in the fabric or variations in the texture of the fabric. Also, it is desirable that warp and filling yarns per se have the maximum straightness and density to facilitate the fabrication. Any desired changes in shape or cross-sectional area of the yarn should take place after the fabric is woven and during subsequent finishing operations. The aforesaid desirable characteristics of warp and filling yarns for weaving are not possessed by normal multi-filament "torque stretch yarns," but by the present invention, these characteristics may be induced to manifest themselves in the yarn.

The process is carried out by utilizing the apparatus of any of the drawings wherein the aforesaid 70 denier "torque stretch yarn" is traveled at a yarn tension of 2 grams through the heated zone to heat the yarn to 300 degrees F. After this processing, the extensibility of the yarn under normal variable warp and weaving tensions is reduced from up to 300% to about 3%. The yarn greatly increases in straightness under the variable warping and weaving tensile stress. In addition, the filaments assume a more compact relationship to produce a more dense yarn, such as shown at 82 in FIG. 10.

When the yarn which has been processed in this manner is woven into a fabric and the fabric is finished in the usual manner, the finished fabric has many advantages over fabrics produced with "torque stretch yarns" not processed. For example, the luster of the yarn after finishing is reduced, thereby reducing the sheen of the fabric. The cross-sectional area or bulk of the yarn is increased in the subsequent finishing operations, thereby contributing to increased opacity in the fabric. The torque forces in the yarn are reduced and more uniformly distributed along the length, thereby reducing the tendency of the fabric to bias. The residual shrinkage of the yarn is reduced which reduces the residual shrinkage in the fabric. The frequency of the filament deformations is increased which results in a finer texture in the finished fabric and contributes to the increased opacity thereof. The resilience of the yarn is increased; the elasticity of the finished fabric is increased; the stretch is reduced; and the recovery from stretch is increased which cooperate to provide good crease-resistance in the fabric.

*Example II*

The object is to produce a 40 denier 13 filament nylon yarn for tricot knitting from a 40 denier 13 filament nylon "torque stretch yarn." "Torque stretch yarns" have generally been unsatisfactory for tricot knitting due to the stretch characteristics of the yarn, the bulkiness of the yarn per se and the lack of uniformity of the yarn in the warps and as it is raveled from the storage package. All of these factors cause difficulties in warping and knitting and produce defects in the knitted fabric.

In producing the yarn, 40 denier 13 filament "torque stretch yarn" is processed on any apparatus of the drawings. The yarn is elongated to activate its dormant forces by applying a yarn tension of 80 grams, then the yarn tension is reduced and maintained at 4 grams as the yarn is heated to a temperature of 360 degrees F. The resultant yarn is similar to that shown in FIG. 10, possessing excellent dimensional stability, being compact and uniform as raveled from its storage package and in the warp and producing uniform knitted fabric.

*Example III*

The object is to produce a no torque yarn for single carrier full fashioned knitting from a 30 denier 14 filament nylon "torque stretch yarn" continuously with the reverse twisting phase of the yarns production. When using "torque stretch yarn" for single carrier full fashioned knitting, it has been necessary to use a two ply yarn composed of one ply with torque in one direction and the second ply with torque in the opposite direction so that the stocking knit therefrom would not tend to twist on a bias. By tending to balance the partially spiralled sections as shown in FIG. 12, it is possible to equalize the overall torque in a "torque stretch yarn." Therefore, it is not necessary to use a yarn balanced by plying.

This process is accomplished by utilizing the apparatus of FIGS. 6 and 7, 7a, 13 and 14, 13a or 13b. The processed 14 filament 30 denier nylon "torque stretch yarn," as it is reverse twisted upon leaving the spindle 52, 152 or 252 is continuously traveled about the feed rolls 54, 154, 254 or 254a and through the heater 57, 157, 257 or 285 with the speed of the feed roll 54, 154, 254, or 254a and the takeup roll 61, feed rolls 158, or feed rolls 258 so adjusted that 60 grams of tension is applied to the yarn at 350 degrees F. The resultant yarn is similar to that shown at 82 in FIG. 10, and when knitted into a stocking and finished, produces a stretch stocking that does not twist on a bias.

*Example IV*

The object is to produce a "torque stretch yarn" having a high degree of extensibility continuously with the reverse twisting phase of the production.

This procedure is accomplished by utilizing the apparatus of FIGS. 6 and 7, 7a, 13 and 14, 13a or 13b with unprocessed 70 denier, 34 filament nylon yarn on the package 46. Processed "torque stretch yarn" is produced by the first heater and the false twist spindle, and as it is reverse twisted upon leaving the exit roll of the spindle, the yarn is continuously traveled around the feed rolls and through the second heating device with the speed of these feed rolls so adjusted that the yarn travels under substantially no tensile stress through the second heating device which is adjusted to heat the yarn to 430 degrees F. For example, these rolls may overfeed substantially relative to the subsequent rolls. The relaxing of the yarn prior to heating permits the yarn to bulk and the relatively high temperature causes further intensification of the filament deformations and twisting upon themselves or pigtailed which become super-positioned. The yarn molecules or structural elements are set in the deformed state and the yarn is similar but exaggerated over that shown at 80 in FIG. 8 and has high bulk and great extensibility which is not substantially affected by storage on the package.

*Example V*

The object is to produce a "torque stretch yarn" having maximum bulk in the yarn per se and a minimum residual shrinkage of the components of the yarn.

This object may be accomplished by utilizing the apparatus of FIGS. 1 and 2, 1a, 7 and 8, 7a, 13 and 14, 13a or 13b, wherein tensile stress approximately that of the yield point of the yarn is applied to a 70 denier 34 filament traveling nylon "torque stretch yarn" by the adjustment of the first tension controlling device to thereby activate the latent characteristics. (In the false-twist apparatus the first heater and the spindle are rendered inoperative.) As the yarn leaves the subsequent feed rolls, all tensile stress is removed from the yarn by overfeeding; then as the yarn passes through the following heating device, it is heated to a temperature above the temperature employed to set the stretch characteristics of the yarn. For example, with nylon, it is heated to just below the melting point of nylon which is about 480 degree F. The stretching of the yarn is approximately to the yield point and the immediate removal of tensile stress, activates the latent forces of the yarn to cause it to increase in bulk. The very high temperature to which the fully relaxed yarn is heated, causes further bulking and causes the structural elements of the yarn to shrink and become set. The yarn produced and processed in this manner is similar but exaggerated over that shown at 80 in FIG. 8, but is uniform along its length, and has maximum bulk, minimum torque and minimum residual shrinkage.

*Example VI*

The object is to produce a no-torque yarn from a "torque stretch yarn." This object may be accomplished by the use of the false-twist apparatus of the drawings with the second heating device de-energized. A package of 70 denier 34 filament nylon "torque stretch yarn" which was originally produced by twisting 70 turns per inch Z, setting the yarn at 435 degrees F. and then reverse twisting 70 turns per inch S is placed on the machine. The "torque stretch yarn" from the package is passed through the apparatus and the spindle motor is controlled to impart 50 turns per inch S to the yarn between the roller of the spindle and the previous rolls or tension-controlling device. The tension on the yarn is regulated to 30 grams and the heater is energized to heat the yarn to 450 degrees F. After the yarn passes the roller of the spindle, it is reverse twisted 50 turns per inch Z and collected on the take-up spool. The yarn on the spool is uniform along its length, exhibits an absence of torque accompanied by high bulk and is similar to that shown at 80 in FIG. 8. The yarn so produced may be fabricated without plying and the resulting fabric has no tendency to bias.

The above experiments and examples show that it is possible to produce many varied characteristics in "torque stretch yarn" by the application of tension and correlated heat, either above or below or at the yield point of the structural elements of the yarn. The heating with correlated tension of the yarn may be preceded or followed by the application of tension above, below, or at the yield point of the yarn. In certain embodiments of the invention, the "torque stretch yarn" may also be false twisted during the application of heat and correlated tension.

In the foregoing examples, the temperature in the processing may be controlled to be below or above the temperatures to which the fabric is subjected in subsequent finishing operations. When desired, and when the temperature is below that of the finishing operation, the properties which are manifest in the yarn prior to finishing may be superceded by the latent properties which are activated when finishing the fabric. For example, a reprocessed yarn having low cross-sectional area or bulk and low stretch after finishing may have high cross-sectional area or bulk, and high stretch. However, the effect of the reprocessing is present and provides a yarn which is bulkier than the bulk yarn prior to reprocessing or a yarn which has a greater stretch than the stretch yarn prior to reprocessing. Thus, the reprocessing of the present invention may induce characteristics in the yarn of the finished fabric which are not present in non-reprocessed "torque stretch yarn."

It has been found that in reprocessing "torque stretch yarn," it is possible to control the physical characteristics in the reprocessed yarn by controlling the degree of tension in the traveling in at least one portion of its continuous travel, heating the yarn during said portion of its continuous travel to a temperature not substantially greater than the temperature originally used in setting its stretch characteristics, and correlating and controlling tension and heat imparted to said yarn with (1) the tensile stress necessary to extend the yarn stretch characteristics, (2) the tensile stress necessary to extend the yarn to the limit of the yarn stretch characteristics, and (3) the yield point of the structural elements of the yarn.

Various tensile stress with correlated heat produce various physical characteristics, as for example, tensile stress below that necessary to extend the yarn stretch characteristics produces a reprocessed yarn with the optimum of stretch and recovery from stretch; tensile stress above that necessary to extend the yarn stretch characteristics and below that necessary to fully extend the yarn to the limit of the yarn stretch characteristics produces a reprocessed yarn with the optimum of bulk in combination with fineness of texture; tensile stress equal to that necessary to extend the yarn to the limit of its stretch characteristics produces a reprocessed yarn of optimum of bulk in combination with dimensional stability; tensile stress above that necessary to extend the yarn to the limit of its stretch characteristics and below the yield point of the structural elements of the yarn produces a reprocessed yarn with the optimum of bulk in combination with stretch and recovery from stretch; tensile stress equal to the yield point of the structural elements of the yarn produces a reprocessed yarn with the optimum of bulk; and tensile stress above the yield point of the structural elements of the yarn produces a reprocessed yarn with the minimum of torque. In all cases, the heat imparted determines the degree of super-positioning of the deformations of the individual filaments.

In the attached drawings, certain conventional elements of the apparatus has been illustrated diagrammatically. In addition, the drives to the various driven components have been shown as separate motors. In actual practice, the apparatus is driven from a common prime mover and variations are obtained by the use of change gears or the like.

While particular embodiments of the present invention have been set forth herein, it is not intended to limit the invention to such disclosure, but changes and modifications may be made therein and thereto within the scope of the following claims.

We claim:

1. Apparatus for thermally processing yarn comprising a support for a supply of yarn, adjustable wind-up means for the processed yarn spaced from said support and operable to draw the yarn continuously at a selected linear speed to said wind-up means, an adjustable heating device intermediate said support and wind-up means to heat the yarn to a selected temperature, a false-twist device operable to twist and untwist the yarn prior to passage thereof through said heating device, adjustable control means operable automatically to regulate the supply of heat energy to said device to maintain the same uniformly at the temperature required to heat the twisted and untwisted yarn to said selected temperature, tension-controlling means including positively-driven feed rolls between said heating device and said false-twist device operable to maintain the yarn at a uniform tension during passage thereof through said heating device, means to regulate the tension-controlling means to control the tension of the yarn to maintain the latter at a selected uniform tension relative to the contractile force and thermal characteristics of the yarn, second tension-controlling means cooperable with said feed rolls to maintain the yarn at a uniform tension in another portion of its passage through said false-twist device, and means to regulate the second tension controlling means to control the tension of the yarn to maintain the latter at a selected uniform tension relative to the contractile force of the yarn.

2. Apparatus according to claim 1 including means to apply a liquid to the yarn passing to said wind-up means.

3. Apparatus according to claim 1 including a second adjustable heating means to heat the same uniformly to a second selected temperature while tensioned by said second tension-controlling means and adjustable control means operable automatically to regulate the heat energy supplied by said second heating means to heat the yarn to said second selected temperature.

4. Apparatus according to claim 3 wherein one of said heating means comprises a trough of circulating hot liquid and a driven roller for applying said hot liquid to the yarn to heat the same.

5. Apparatus according to claim 3 wherein each of said heating means comprises an electrically energized heating device.

6. Apparatus according to claim 5 wherein each of said electrically energized heating devices comprises a heated plate over which the yarn passes to be heated by contact.

7. Apparatus according to claim 5 wherein each of said electrically energized heating devices comprises a heated tube surrounding said yarn and through which said yarn passes to be heated by radiation.

References Cited in the file of this patent

UNITED STATES PATENTS

| | | |
|---|---|---|
| 2,583,227 | Neidigh | Jan. 22, 1952 |
| 2,584,779 | Averns et al. | Feb. 5, 1952 |
| 2,628,405 | Wentz | Feb. 17, 1953 |
| 2,761,272 | Vandamme et al. | Sept. 4, 1956 |
| 2,790,298 | Kunzle | Apr. 30, 1957 |
| 2,803,105 | Stoddard et al. | Aug. 20, 1957 |
| 2,803,108 | Stoddard et al. | Aug. 20, 1957 |
| 2,803,109 | Stoddard et al. | Aug. 20, 1957 |
| 2,869,312 | Van Dijk | Jan. 20, 1959 |

FOREIGN PATENTS

| | | |
|---|---|---|
| 531,481 | Italy | Aug. 2, 1955 |